US006928652B1

(12) United States Patent
Goldman (10) Patent No.: US 6,928,652 B1
(45) Date of Patent: *Aug. 9, 2005

(54) METHOD AND APPARATUS FOR DISPLAYING HTML AND VIDEO SIMULTANEOUSLY

(75) Inventor: Phillip Y. Goldman, Los Altos, CA (US)

(73) Assignee: WEBTV Networks, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 201 days.

(21) Appl. No.: 09/087,354

(22) Filed: May 29, 1998

(51) Int. Cl.$^7$ .......................... H04N 5/445; G06F 3/00; G06F 13/00

(52) U.S. Cl. .................... 725/37; 709/217; 709/218; 709/219; 345/760; 725/51; 725/112; 725/117

(58) Field of Search ................................ 725/37, 51, 112, 725/117, 136; 709/217, 218, 219; 715/513; 345/760; 348/564, 584, 589, 600

(56) References Cited

U.S. PATENT DOCUMENTS

| | | | | |
|---|---|---|---|---|
| 5,774,664 A | * | 6/1998 | Hidary et al. | 395/200.48 |
| 5,774,666 A | * | 6/1998 | Portuesi | 395/200.48 |
| 5,818,935 A | * | 10/1998 | Maa | |
| 5,889,950 A | * | 3/1999 | Kuzma | 395/200.48 |
| 5,940,073 A | * | 8/1999 | Klosterman et al. | 345/721 |
| 5,987,509 A | * | 11/1999 | Portuesi | 709/217 |
| 6,061,719 A | * | 5/2000 | Bendinelli et al. | |
| 6,097,441 A | * | 8/2000 | Allport | |
| 6,154,771 A | * | 11/2000 | Rangan et al. | 709/217 |
| 6,172,677 B1 | * | 1/2001 | Stautner et al. | 345/716 |
| 6,201,538 B1 | * | 3/2001 | Wugofski | 345/327 |
| 2002/0007493 A1 | * | 1/2002 | Butler et al. | 725/109 |

* cited by examiner

*Primary Examiner*—Vivek Srivastava
*Assistant Examiner*—Ngoc Vu
(74) *Attorney, Agent, or Firm*—Workman Nydegger (57) ABSTRACT

A graphical user interface (GUI) includes a hyper text mark-up language (HTML) document. A video image from broadcast data is displayed in a same window with the HTML document.

6 Claims, 7 Drawing Sheets

METHOD AND APPARATUS FOR DISPLAYING HTML AND VIDEO SIMULTANEOUSLY

FIELD OF THE INVENTION

The present invention relates to the field of entertainment systems. More specifically, the present invention relates to a method and apparatus for presenting Hyper Text Mark-up Language (HTML) documents with video images on a display to enhance a viewer's viewing experience.

BACKGROUND OF THE INVENTION

The Internet has become an expansive backbone of communication with a vast repository of information. The reason for its popularity is due in large part to the development of the hypertext mark-up language (HTML). HTML has transformed the Internet from the black and white world of text into the vibrant multi-media environment that it is today.

HTML is a document-layout and hyperlink-specification language. It defines the syntax and placement of special, embedded directions that instruct a web browser on how to display the contents of the document, including text, images, and other support media. HTML tells a web browser how to make a document interactive through special hypertext links, which connect a document with other documents, as well as with other Internet resources such as FTP and Gopher. HTML is responsible for unifying pictures, sounds, and text in a document allowing programmers to design the rich, multi-media-filled web pages that have propelled the Internet as a new medium for worldwide information exchange and commerce.

With the current trend in the electronics and computer industry to converge the computer system and more traditional entertainment system components such as the television, it is possible to combine displaying video images from broadcast data with HTML documents. Thus, an improved method and apparatus for displaying an HTML document with a video image is desired.

SUMMARY OF THE INVENTION

A graphical user interface (GUI) according to a first embodiment of the present invention is disclosed. The GUI includes a hyper text mark-up language (HTML) document. A video image from broadcast data is displayed in a same window with the HTML document.

A graphical user interface (GUI) according to a second embodiment of the present invention is disclosed. The GUI includes a hyper text mark-up language (HTML) document. A video image from broadcast data is positioned around the HTML document.

A graphical user interface (GUI) according to a third embodiment of the present invention is disclosed. The GUI includes a hyper text mark-up language (HTML) document. A video image from broadcast data is positioned such that it has the appearance of being behind the HTML document.

A graphical user interface (GUI) according to a fourth embodiment of the present invention is disclosed. The GUI includes a video image from broadcast data. A hyper text mark-up language (HTML) document is positioned on the GUI such that the HTML based form has the appearance of covering a section of the video image.

A method for configuring a graphical user interface (GUI) according to a fifth embodiment of the present invention is disclosed. A hyper text mark-up language (HTML) document is decoded from broadcast data. A video image from the broadcast data is displayed on a display. The HTML document is displayed on the display such that the HTML document has the appearance of covering a portion of the video image.

A method for configuring a graphical user interface (GUI) according to a sixth embodiment of the present invention is disclosed. A hyper text mark-up language (HTML) document is decoded from broadcast data. A video image from the broadcast data is displayed on a display. The HTML document is displayed on the display such that the HTML document and the video image are in a same window.

A method for configuring a graphical user interface (GUI) according to a seventh embodiment of the present invention is disclosed. A hyper text mark-up language (HTML) document is decoded from broadcast data. The HTML document is displayed on a display. A video image from the broadcast data is displayed on the display such that the video image has the appearance of being positioned around the HTML document.

A method for configuring a graphical user interface (GUI) according to an eighth embodiment of the present invention is disclosed. A hyper text mark-up language (HTML) document is decoded from broadcast data. The HTML document is displayed on a display. A video image from the broadcast data is displayed on the display such that the video image has the appearance of being behind the HTML document.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
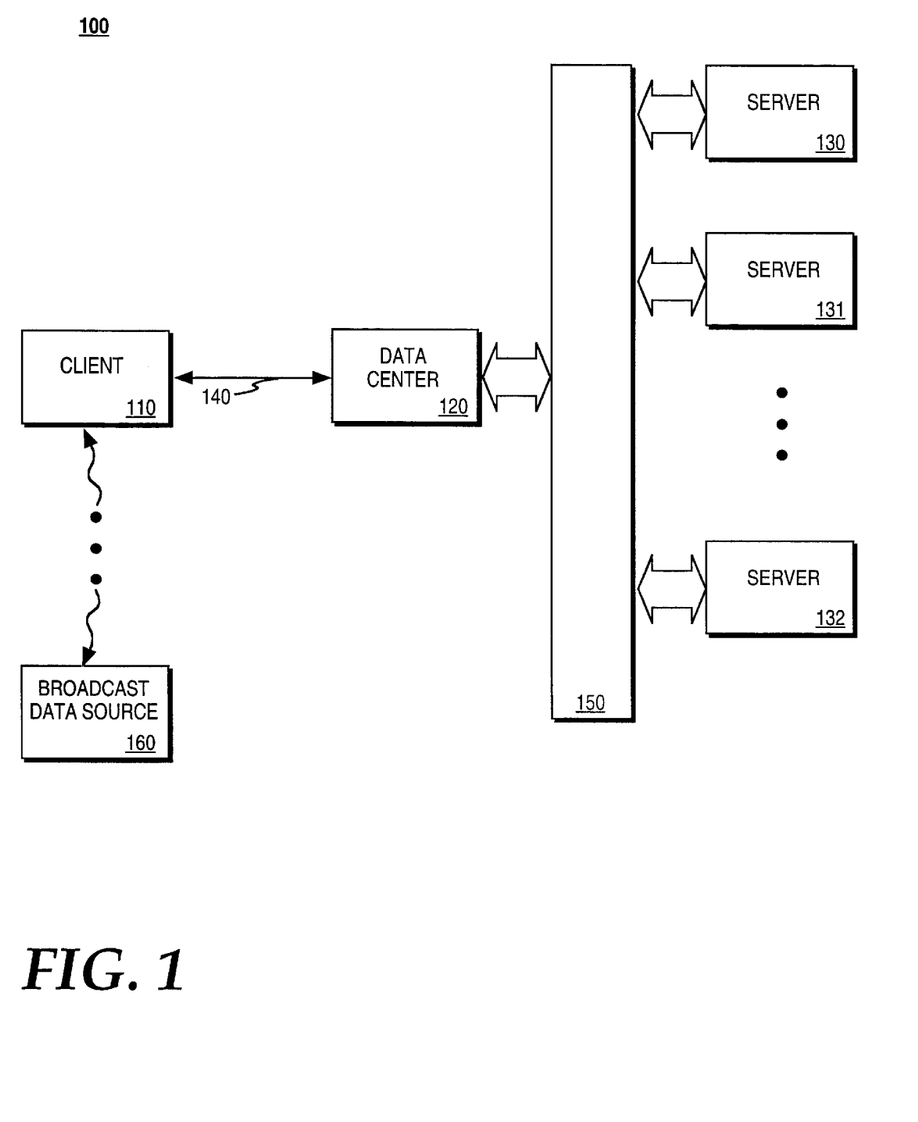
FIG. 1 is a block diagram of a network in which an embodiment of the invention is implemented.

FIG. 1 illustrates a network 100 in which an embodiment of the present invention is implemented. Block 150 represents the Internet. Blocks 130–132 represents server computer systems connected to the Internet 150. According to an embodiment of the present invention, each of the server computer systems 130–132 is a HyperText Transfer Protocol (HTTP) server that stores HTML documents. Each of the server computer system 130–132 has an Internet domain name. The server computer systems 130–132 include HTML documents that have an URL that includes the document's name, preceded by the hierarchy of directory names in which the document is stored, the Internet domain name of the server that hosts the document, and the software and manner by which the browser and the document's host server communicate to exchange the document.

Block 110 represents a client computer system. The client computer system 110 is a convergent computer system that allows a user to view both video images from broadcast data and data from a computer system, such as HTML documents, off of a single display device.

Block 160 represents a broadcast data source. The broadcast data source 160 operates to transmit broadcast data to the client computer system 100. The broadcast data may include video, audio, HTML or other type of data. Broadcast data may be transmitted from the broadcast data source 160 to the client computer system via a cable broadcast, satellite broadcast, very high frequency (VHF) or ultra high frequency (UHF) communication from an aerial antenna, or using other transmission techniques. According to an embodiment of the network 100, the broadcast data source 160 delivers HTML documents to the client computer system 110 with the broadcast data. The HTML documents may be encoded as HTML code in a line of the vertical blanking interval or encoded elsewhere in the broadcast data.

Block 120 represents a data center. The data center 120 is connected to the Internet 150 and operates to facilitate a connection between the client computer system 110 and the Internet 150 such that the client computer system 110 may access the HTML documents stored in the server computer systems 130–132. Data is passed between the client computer system 110 and the server computer systems 130–132 through the data center 120. The client computer system 110 interfaces the data center 120 via an intermediate connection 140. According to one embodiment of the present invention, the intermediate connection 140 may be a direct telephone connection to the data center 120. According to a second embodiment of the present invention, the intermediate connection 140 may be an indirect connection to the data center 120 via a direct telephone connection to a Post Office Protocol (POP) server that interfaces the data center 120.

Figure 2:
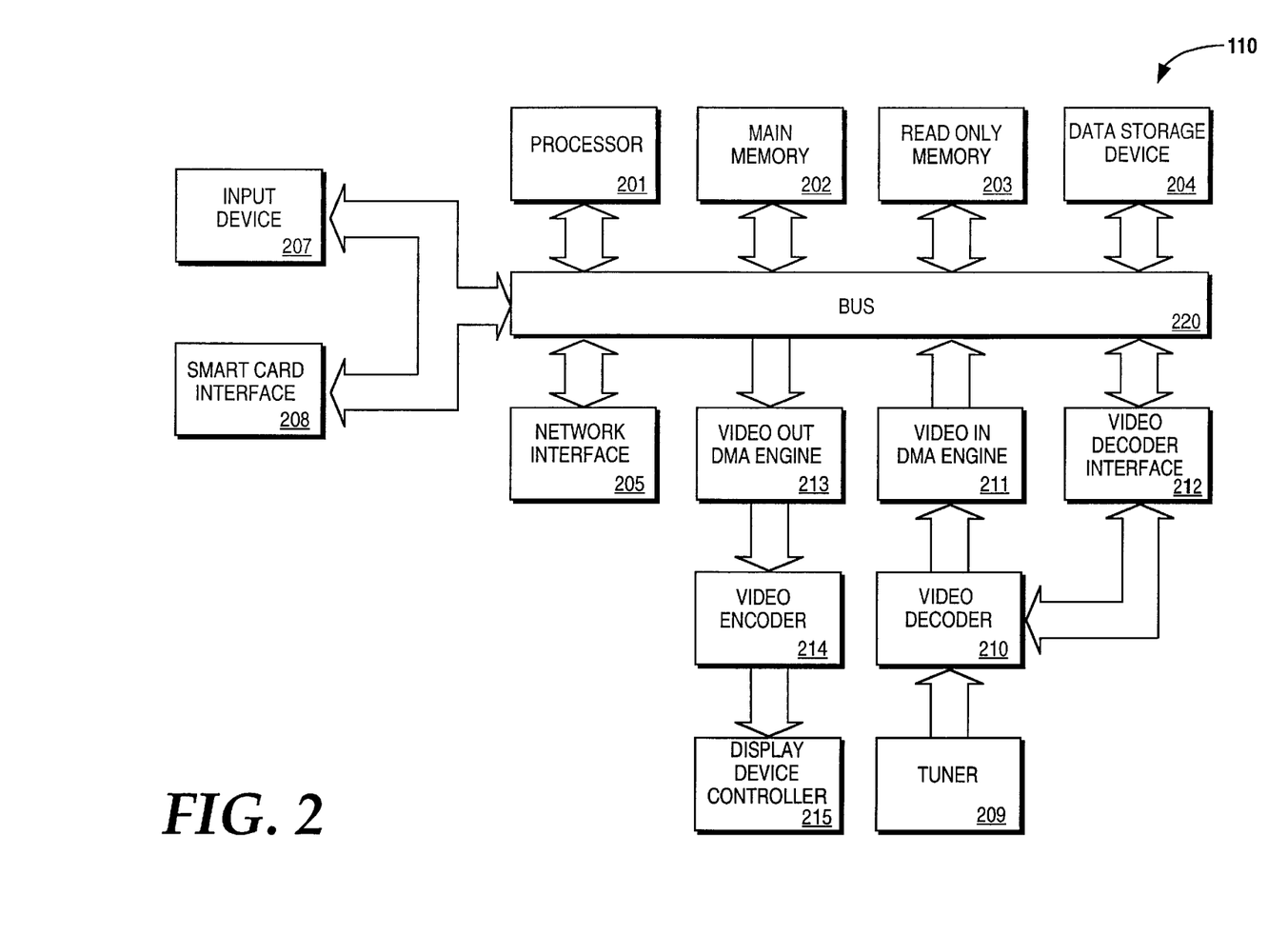
FIG. 2 is a block diagram of a client computer system in which an embodiment of the invention is implemented.

Referring to FIG. 2, a client computer system upon which an embodiment of the present invention can be implemented is shown as 110. The client computer system 110 comprises a processor 201 that processes digital data. The processor 201 may be a complex instruction set computing (CISC) microprocessor, a reduced instruction set computing (RISC) microprocessor, a very long instruction word (VLIW) microprocessor, a processor implementing a combination of instruction sets, a microcontroller, or other processor device. The processor 201 may be a single processor device or a plurality of processing devices. The processor 201 is coupled to a bus 220 which transmits data signals between the processor 201 and other components in the computer system 110. The bus 220 may be a single bus or a plurality of buses.

A main memory 202 is coupled to the bus 220 and may comprise a dynamic random access memory (DRAM) device, a static random access memory (SRAM) device, or other memory devices. The main memory 202 stores information or other intermediate data executed by the processor 201. The client computer system 110 also comprises a read only memory (ROM) and/or other static storage device 203 coupled to the bus 220 that stores information and instructions for the processor 201.

A data storage device 204 is coupled to the bus 220 and stores information and instructions. The data storage device 204 may be a hard disk drive, a floppy disk drive, a CD-ROM device, a flash memory device or other mass storage device. A network interface 205 is coupled to the bus 220. The network interface 205 operates to connect the client computer system 110 to the network 100 (shown in FIG. 1). According to an embodiment of the present invention, the network interface 205 is a modem that connects the client computer system 110 to the intermediate connection 140 (shown in FIG. 1).

An input device 207, including alphanumeric and other keys, is typically coupled to the bus 220 for communicating information and command selections to the processor 201. In an alternate embodiment of the present invention the input device 207 is not directly coupled to the bus 220, but interfaces with the computer system 200 via infra-red coded signals transmitted from the input device to a infra-red receiver in the computer system (not shown). In still an alternate embodiment of the present invention, the input device 207 is a remote control unit having keys that selects characters or command selections on the display device.

A smart card interface 208 is coupled to the bus 220. According to an embodiment of the present invention, the smart card interface 208 may operate to read or write to a smart card. The smart card interface 208 includes a sensor 209 that detects when a smart card has been inserted in the smart card interface 208. The smart card interface 208 may be used to communicate with a contact or contactless smart card.

The client computer system 110 includes a tuner 209. The tuner 209 operates to receive broadcast data from the broadcast data source 160. The tuner 209 may include a cable tuner, a satellite tuner, a VHF/UHF tuner, or other broadcast data receiving devices. The tuner 209 is coupled to a video decoder 210. In an embodiment of the client computer system 110 where the tuner 209 receives analog broadcast data, the video decoder 210 operates to decode the twenty-first line of the VBI in analog broadcast data into closed captioning data in ASCII text and digitizes the analog broadcast data. In an embodiment of the client computer system 110 where the tuner 209 receives digital broadcast data, the video decoder 210 operates to retrieve a channel in the digital broadcast that contains the closed captioning data. Closed captioning data is transmitted simultaneously with a program and provides a textual script of the dialog in the program in real-time.

A video decoder interface 212 is coupled to the video decoder 210. The video decoder interface 212 operates as a serial interface to retrieve the closed captioning data from the video decoder 210. A video in direct memory access (DMA) engine 211 is also coupled to the video decoder 210. The video in DMA engine 211 operates to coordinate movement of the digitized broadcast data from the video decoder 210 to components in the client computer system 110 via the bus 220. The video in DMA engine 211 allows the digitized broadcast data to be transmitted to components in the client computer system 110 at a fast rate without requiring intervention from the processor 201.

A video out DMA engine 213 is coupled to the bus 220. The video out DMA engine 213 operates to coordinate movement of the digitized broadcast data from components in the client computer system 110 to a video encoder 214. The digitized broadcast data may include modification or additions made to it from the components in the client computer system 110 such as the processor 201. The video out DMA engine 213 allows the digitized broadcast data to be transmitted from components in the client computer system 110 to the video encoder 214 at a fast rate without requiring intervention from the processor 201. The video encoder 214 is coupled to the video out DMA engine 213.

The video encoder 214 operates to format the digitized broadcast data into a form that can be viewed by a display device. According to an embodiment of the present invention where the display device is configured to view analog broadcast data, the video encoder 214 operates to format the digitized broadcast data into an analog format.

A display device controller 215 is coupled to the video encoder 214. The display device controller 206 allows coupling of a display device to the client computer system 110 and operates to interface the display device to the client computer system 110. The display device controller 206 can be, for example, a monochrome display adapter (MDA) card, a color graphics adapter (CGA) card, or other display device controller. The display device (not shown) can be a television set, a computer monitor, a flat panel display or other display device. The display device receives broadcast data from the video encoder 214 through the display device controller 206 and displays the information and data to the user of the client computer system 110.

The present invention is related to the use of the client computer system 110 to display HTML documents with video images. According to one embodiment, displaying HTML documents with video images is performed by the client computer system 110 in response to the processor 201 executing sequences of instructions contained in main memory 202 or ROM 203. Such instructions may be read into memory 202 from another computer-readable medium, such as data storage device 204, or from another source via the network interface 205 or from the tuner 209. Execution of the sequences of instructions causes the processor 201 to display HTML documents with video images, as will be described hereafter. In an alternative embodiment, high-wired circuitry may be used in place of or in combination with software instructions to implement the present invention. Thus, the present invention is not limited to any specific combination of hardware circuitry and software.

Figure 3:
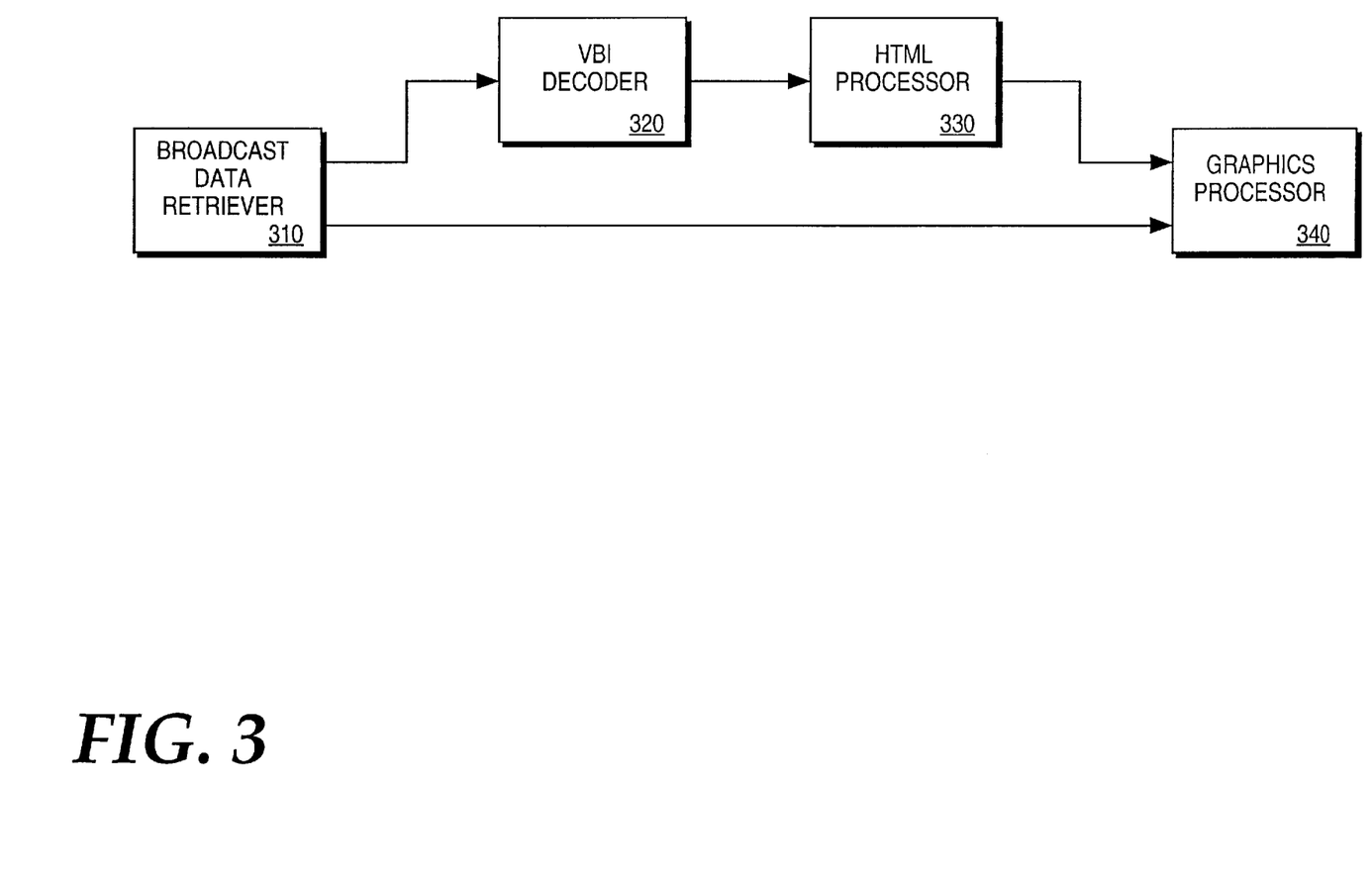
FIG. 3 is a block diagram of modules implementing an embodiment of the present invention.

FIG. 3 is a block diagram showing modules 300 implementing an embodiment of the present invention. In a preferred embodiment of the present invention, the modules are implemented by software and reside in main memory 202 as sequences of instructions. It should be appreciated that the modules may also be implemented by hardware as components coupled to the bus 220 or a combination of both hardware and software.

Block 310 represents a broadcast data retriever 310. The broadcast data retriever 310 operates to interface with the bus 220 and to coordinate movement of the digitized broadcast data from the video decoder 210 with the video in DMA engine 211. The broadcast data retriever 310 receives the digitized broadcast data from the video in DMA engine 211 and separates the digitized broadcast data containing a video image from broadcast data carrying other information. In one embodiment, the other information is broadcasted on the VBI.

Block 320 represents a VBI decoder. The VBI decoder 320 is coupled to the broadcast data retriever 310 and receives the digitized VBI from the broadcast data retriever 310. The VBI decoder 320 operates to decode the digitized VBI into HTML code. It should be appreciated that the HTML code may be decoded elsewhere in the broadcast data.

Block 330 represents an HTML processor. The HTML processor 330 is coupled to the VBI decoder and receives the HTML code from the VBI decoder 320. The HTML processor 330 interprets the HTML code and generates a viewable HTML document from the HTML code. The viewable HTML document may include for example an HTML form having selectable multimedia identifiers. According to an embodiment of the present invention, the HTML processor 330 may be a web browser.

Block 340 represents a graphics processor 340. The graphics processor 340 is coupled to the HTML processor 330 and the broadcast data retriever 310 and receives the viewable HTML document from the HTML processor 330 and broadcast data containing a video image from the broadcast data retriever 310. The graphics processor 340 operates to generate a graphical user interface (GUI) that includes both the HTML document and the video image. According to a first embodiment of the present invention, the graphics processor 340 generates a GUI that includes a HTML document and a video image from broadcast data positioned around the HTML document. According a second embodiment of the present invention, the graphics processor 340 generates a GUI that includes a HTML document and a video image from broadcast data positioned such that it has the appearance of being behind the HTML document. According to a third embodiment of the present invention, the graphics processor 340 generates a GUI that includes a video image from broadcast data and a HTML document positioned on the GUI such that the HTML document has the appearance of covering a section of the video image.

The broadcast data retriever 310, VBI decoder 320, the HTML processor 330, and the graphics processor 340 may be implemented by any known circuitry or technique. According to an embodiment of the present invention, the broadcast data retriever 310, VBI decoder 320, the HTML processor 330, and the graphics processor 340 all reside in a single semiconductor substrate.

Figure 4:
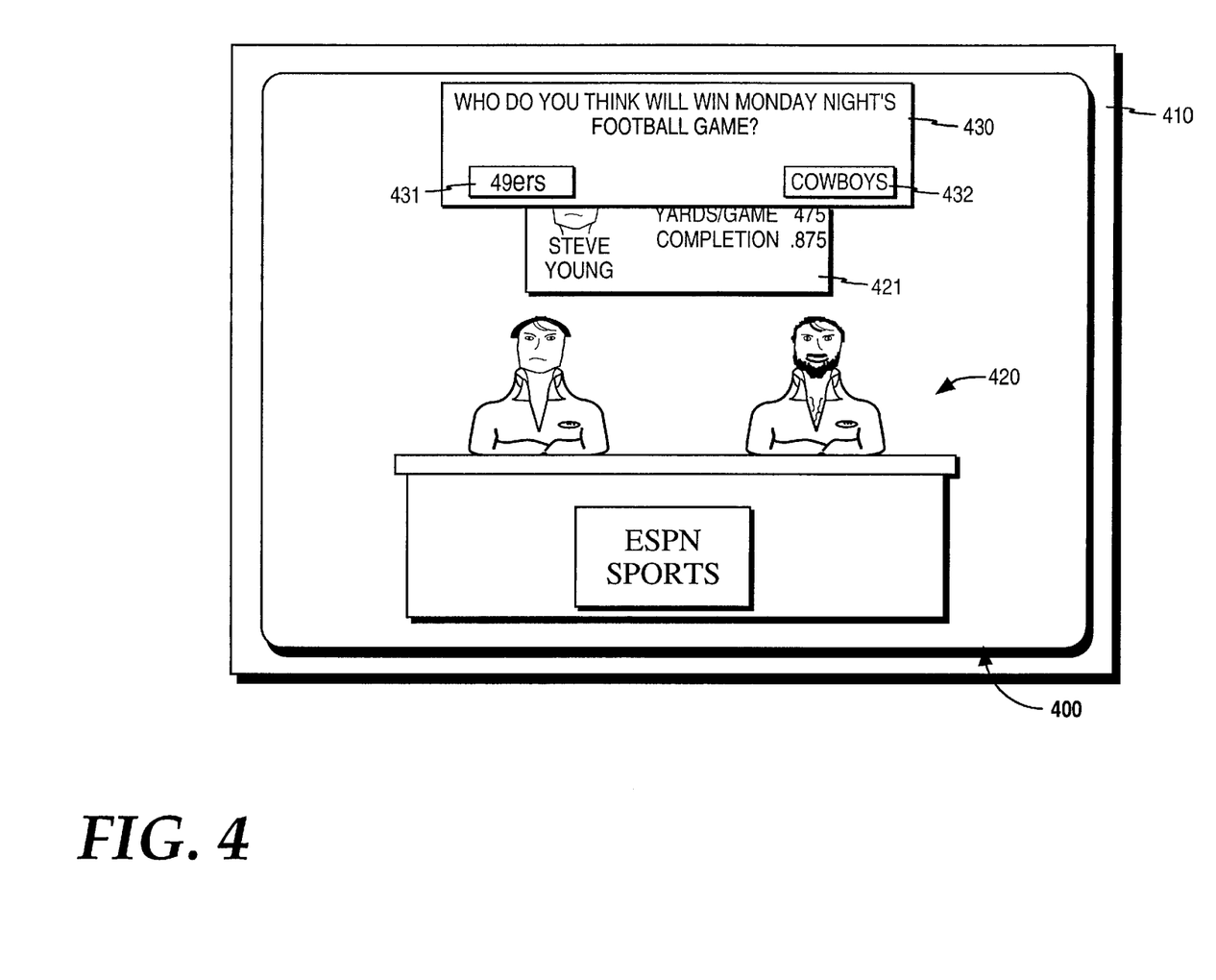
FIG. 4 illustrates an exemplary graphical user interface according to a first embodiment of the present invention.

FIG. 4 illustrates an exemplary GUI 400 as it appears on a screen of a display 410 according to a first embodiment of the present invention. The GUI 400 includes a video image from broadcast data. The video image 400 from the broadcast data is displayed such that it spans the entire length and width of the screen of the display 410. According to this embodiment of the GUI 400, the video image from the broadcast data includes an image of two sportscasters sitting behind a news desk 420 and a chart 421 directly above the two sportscasters that includes statistics about a sporting event. An HTML document 430 is positioned on the GUI 400 such that it has the appearance of covering a section of the video image and the video image from the broadcast data is positioned such that it has the appearance of being behind the HTML document 430. The HTML document 430 includes a first multimedia identifier 431 and a second multimedia identifier 432 that are selectable to deliver data to a remote computer system such as server computer systems 130–132 (shown in FIG. 1). The first and second multimedia identifiers may be, for example, hyperlinks to HTML documents on a remote computer system that compile data for a survey. By displaying the HTML document 430 and the video image in a single window, the scale of the video image is maximized on the display 410.

Figure 5:
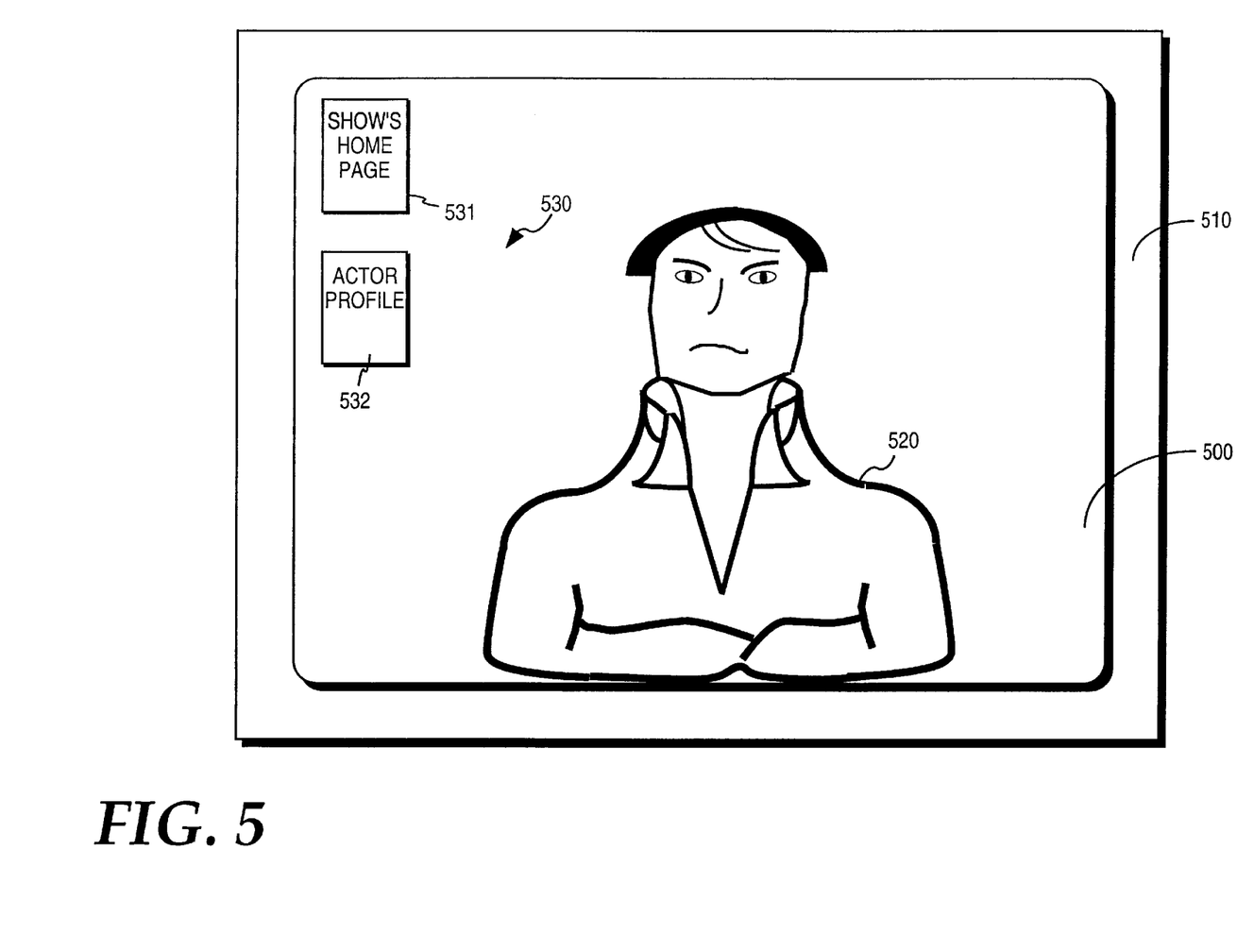
FIG. 5 illustrates an exemplary graphical user interface according to a second embodiment of the present invention.

FIG. 5 illustrates an exemplary GUI 500 as it appears on a screen of a display 510 according to a second embodiment of the present invention. The GUI 500 includes a video image from broadcast data. The video image from the broadcast data is displayed such that it spans the entire length and width of the display 510. According to this embodiment of the GUI 500, the video image from the broadcast data includes an image of an actor 520 from a television show. An HTML document 530 is positioned on the GUI 500 such that it has the appearance of covering a section of the video image and the video image from the broadcast data is positioned such that it has the appearance of being behind the HTML document 530. The HTML document 530 includes a first multimedia identifier 531 and a second multimedia identifier 532 that are selectable to deliver data from a remote computer system such as server computer systems 130–132 (shown in FIG. 1). The first and second multimedia identifiers may be, for example, hyperlinks to HTML documents on a remote server relating to information about the television show or profiles of the actor of the television show.

Figure 6:
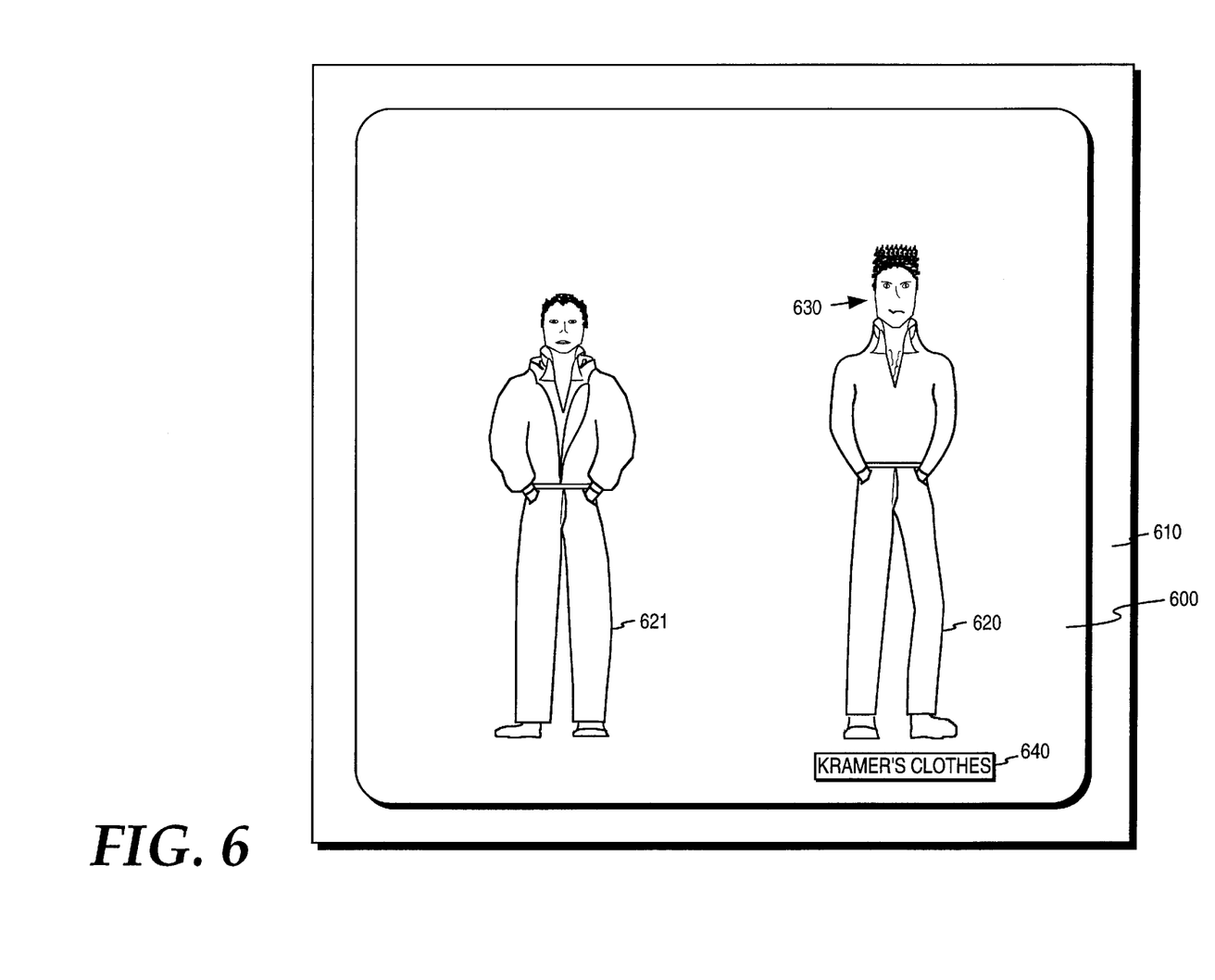
FIG. 6 illustrates an exemplary graphical user interface according to a third embodiment of the present invention.

FIG. 6 illustrates an exemplary GUI 600 as displayed on a display 610 according to a third embodiment of the present invention. The GUI 600 includes a video image from broadcast data. The video image from the broadcast data is displayed such that it spans the entire length and width of the screen of the display 610. According to this embodiment of the GUI 600, the video image from the broadcast data includes an image of a first actor 620 and an image of a second actor 621 from a television show. An HTML document encoded with the broadcast data defines an area surrounding the first actor 620 and the second actor 621 as a input device-sensitive region or a "hot spot" on the GUI 600. According to an embodiment of the present invention, the hot spot is highlighted to indicate its presence. It should be appreciated that the hot spot may be transparent. According to an embodiment of the present invention, when a pointer 630 from an input device 207 (shown in FIG. 2) points to the hot spot, text 640 appears next to the hot spot indicating what information will be presented when the hot spot is selected by the input device 207. The text may include for example merchandise information regarding items used in the television program. The hot spots may be hyperlinks to HTML documents on a remote computer system such as server computer systems 130–132 (shown in FIG. 1) that include the information.

Figure 7:
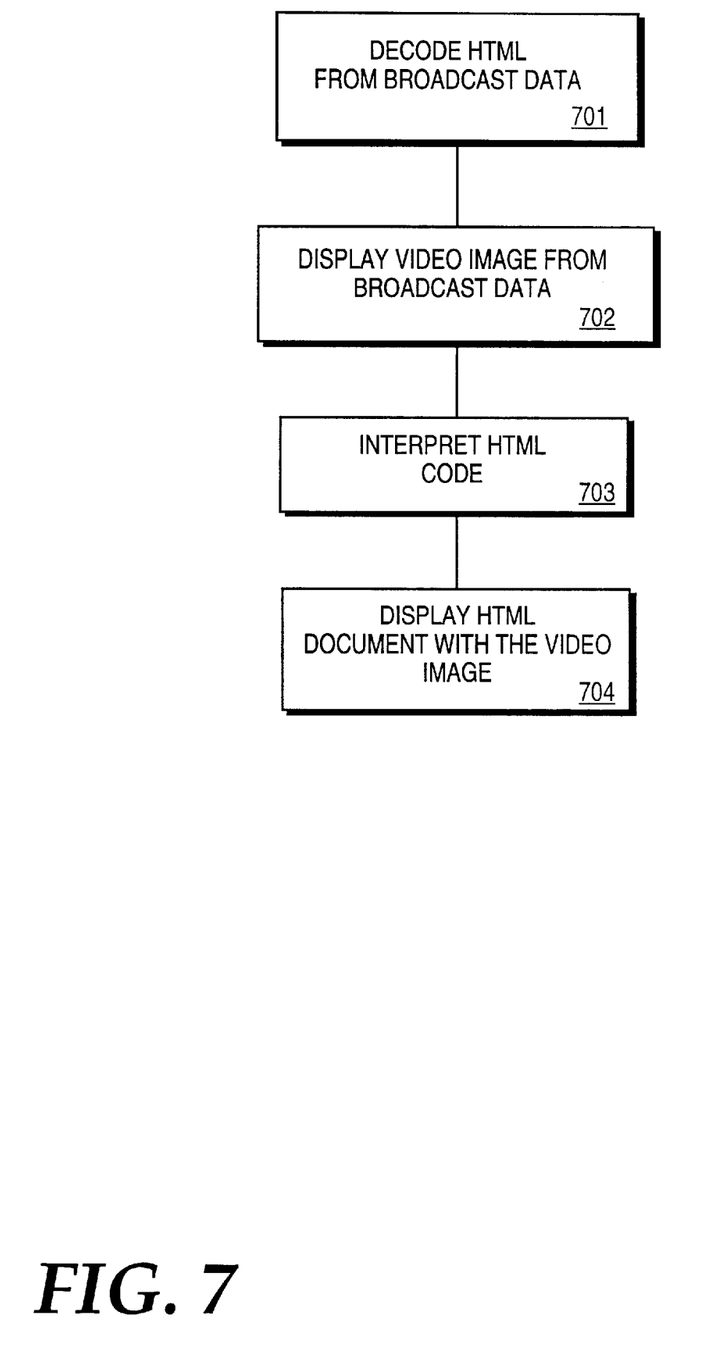
FIG. 7 is a flow chart illustrating a method for displaying an HTML document with a video image according to an embodiment of the present invention.

FIG. 7 is a flow chart illustrating a method for displaying a HTML document with a video image according to an embodiment of the present invention. At step 701, HTML code is decoded from broadcast data. The broadcast data may be for example broadcast data originating from a broadcast data source that includes a television program. According to an embodiment of the present invention, the HTML code is decoded from a VBI of the broadcast data using a VBI decoder. According to an alternate embodiment of the present invention, the HTML code is decoded elsewhere from the broadcast data.

At step 702, a video image from the broadcast data is displayed on a display. According to an embodiment of the present invention, the video image is displayed substantially over the entire display such that the video image spans the entire length and width of the display.

At step 703, the HTML code is interpreted to generate an HTML document. According to the present invention, the HTML code may be interpreted using a web browser.

At step 704, the HTML document is displayed on the display with the video image. According to a first embodiment of the present invention, the HTML document and the video image are displayed on the same window. By displaying the video image and the HTML document on a single window, the video image may be displayed without reducing its scale. According to a second embodiment of the present invention, the video image is positioned around the HTML document. According to a third embodiment of the present invention, the video image is positioned such that it has the appearance of being behind the HTML document. According to a fourth embodiment of the present invention, the HTML document is displayed with the video image such that the HTML document has the appearance of covering a portion of the video image.

In the foregoing specification, the invention has been described with references to specific embodiments thereof. It will, however, be evident that various modifications and changes may be made thereto without departing from the broader spirit and scope of the invention. The specification and the drawings are, accordingly, to be regarded in an illustrative rather than a restrictive sense.

What is claimed is:

1. In a system that receives broadcast data from a broadcast data source that encodes a document, a method for displaying both the broadcast data and the document while connecting with one or more remote servers and displaying additional documents retrieved from the one or more remote servers, the method comprising:

displaying video images of the broadcast data in a window of the display device;

decoding the document that is encoded in the broadcast data, the encoded document including one or more links that identify additional information that can be accessed in additional documents by a user when the one or more links are selected by the user;

converting the decoded document into a viewable document, the viewable document including the one or more links that can be selected by a user;

processing the viewable document with the broadcast data such that some of the video images of the broadcast data are simultaneously displayed with the viewable document in the same window as the displayed video images, the viewable document being independent of any particular video image of the broadcast data;

retrieving the additional documents from the one or more remote servers when a link is selected; and displaying the additional documents in the same window as each video image of the broadcast data without resizing each video image.

2. A method as defined in claim 1, wherein the document includes a multimedia identifier that is selectable to deliver data to a remote computer system.

3. A method as recited in claim 1, wherein each video image spans an entire length and width of a display.

4. A method as recited in claim 1, wherein the document is a hyper text markup language document.

5. A method as recited in claim 1, wherein the document includes a multimedia identifier that is selectable to deliver data to be displayed in the same window as each video image of the broadcast data.

6. A method as recited in claim 1, wherein each video image from the broadcast data comprises a video image from a television program.

* * * * *